United States Patent
Kim et al.

(10) Patent No.: US 11,352,061 B2
(45) Date of Patent: Jun. 7, 2022

(54) FRONT BODY STRUCTURE OF VEHICLE

(71) Applicants: HYUNDAI MOTOR COMPANY, Seoul (KR); KIA MOTORS CORPORATION, Seoul (KR)

(72) Inventors: Do Hoi Kim, Seoul (KR); Jai Hak Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 282 days.

(21) Appl. No.: 16/689,331

(22) Filed: Nov. 20, 2019

(65) Prior Publication Data

US 2021/0024133 A1    Jan. 28, 2021

(30) Foreign Application Priority Data

Jul. 24, 2019    (KR) ........................ 10-2019-0089884

(51) Int. Cl.
*B62D 21/03* (2006.01)
*B62D 21/08* (2006.01)
*B62D 21/15* (2006.01)

(52) U.S. Cl.
CPC ............. *B62D 21/03* (2013.01); *B62D 21/08* (2013.01); *B62D 21/155* (2013.01)

(58) Field of Classification Search
CPC .. B62D 21/152; B62D 21/155; B62D 25/084; B62D 25/085; B62D 21/03; B62D 21/08
USPC .......................... 296/187.09, 193.09, 203.02
See application file for complete search history.

(56) References Cited

U.S. PATENT DOCUMENTS

| | | | | |
|---|---|---|---|---|
| 8,167,361 B2 * | 5/2012 | Riviere | ................ | B62D 25/084 |
| | | | | 296/193.09 |
| 8,191,959 B2 | 6/2012 | Ritz | | |
| 9,290,138 B2 | 3/2016 | Muraji et al. | | |
| 10,106,197 B2 | 10/2018 | Hart | | |
| 10,486,745 B1 * | 11/2019 | Kim | ........................ | B60R 19/18 |
| 2007/0182211 A1 * | 8/2007 | Sub | ....................... | B62D 29/001 |
| | | | | 296/193.09 |
| 2008/0067838 A1 * | 3/2008 | Nakamae | ............. | B62D 25/084 |
| | | | | 296/203.02 |
| 2009/0058134 A1 * | 3/2009 | Hiraishi | ................. | B62D 21/11 |
| | | | | 296/187.09 |
| 2009/0058135 A1 * | 3/2009 | Murata | ................... | B62D 21/11 |
| | | | | 296/187.09 |
| 2012/0187720 A1 * | 7/2012 | Tomozawa | ........... | B62D 25/082 |
| | | | | 296/187.09 |

(Continued)

FOREIGN PATENT DOCUMENTS

JP      2000-108936 A     4/2000
KR   10-2011-0114263 A   10/2011

(Continued)

*Primary Examiner* — Gregory A Blankenship
(74) *Attorney, Agent, or Firm* — Lempia Summerfield Katz LLC (57) ABSTRACT

A front body structure of a vehicle includes: a closed loop member projected on a front surface of a body to form a closed loop such that both sides of the closed loop are coupled to front ends of front side members at both sides of the body, a back beam assembly coupled to a front part of the closed loop member, and lower reinforcement members connecting a lower portion of the closed loop member, at both sides thereof, to a front part of a subframe.

9 Claims, 7 Drawing Sheets

(56) References Cited

U.S. PATENT DOCUMENTS

| | | | | |
|---|---|---|---|---|
| 2014/0042775 | A1* | 2/2014 | Steinmetz | B60R 19/34 |
| | | | | 296/187.09 |
| 2015/0183468 | A1* | 7/2015 | Shirooka | B62D 21/155 |
| | | | | 296/187.1 |
| 2015/0251613 | A1* | 9/2015 | Mori | B62D 21/152 |
| | | | | 296/187.09 |
| 2016/0090127 | A1* | 3/2016 | Park | B60R 19/24 |
| | | | | 296/193.09 |
| 2016/0121829 | A1 | 5/2016 | Murata et al. | |
| 2019/0111774 | A1* | 4/2019 | Fukuoka | B60R 19/34 |
| 2020/0086920 | A1* | 3/2020 | Okamoto | B62D 25/082 |
| 2020/0324820 | A1* | 10/2020 | Kim | B62D 25/08 |
| 2021/0024133 | A1* | 1/2021 | Kim | B62D 29/04 |

FOREIGN PATENT DOCUMENTS

| | | | | |
|---|---|---|---|---|
| KR | 10-1160355 B1 | | 6/2012 | |
| KR | 10-1192735 B1 | | 10/2012 | |
| KR | 10-2017-0064426 A | | 6/2017 | |
| WO | WO 2012101923 | * | 8/2012 | B62D 25/084 |

* cited by examiner

FRONT BODY STRUCTURE OF VEHICLE

CROSS REFERENCE TO RELATED APPLICATION

This application claims priority to and the benefit of Korean Patent Application No. 10-2019-0089884, filed on Jul. 24, 2019, the entire contents of which are incorporated herein by reference.

FIELD

The present disclosure relates to a front body structure of a vehicle.

BACKGROUND

The statements in this section merely provide background information related to the present disclosure and may not constitute prior art.

An electric vehicle tends to have a relatively short overhang as no engine is mounted in the front of its body corresponding to the engine compartment of a conventional vehicle equipped with an internal combustion engine. Especially, a very small electric vehicle tends to have a very short overhang.

As described above, the very short overhang of the body is advantageous in reducing the weight of the vehicle, but it means that, in the event of vehicle collision, the space to absorb shocks is relatively reduced due to deformation, resulting in a considerable reduction in the collision safety of the vehicle.

The foregoing is intended merely to aid in the understanding of the background of the present disclosure, and is not intended to mean that the present disclosure falls within the purview of the related art that is already known to those skilled in the art.

SUMMARY

The present disclosure proposes a front body structure of a vehicle, capable of improving collision performance of a vehicle by effectively distributing and absorbing collision loads due to the forward collision of the vehicle, while having a short overhang as in a very small electric vehicle or the like.

In accordance with an aspect of the present disclosure, a front body structure of a vehicle includes: a closed loop member projected on a front surface of a body to form a closed loop such that both sides of the closed loop are coupled to front ends of front side members at both sides of the body, a back beam assembly coupled to a front part of the closed loop member, and lower reinforcement members connecting a lower portion of the closed loop member, at both sides thereof, to a front part of a subframe.

The closed loop member may be a front end module carrier.

The back beam assembly may include back beam support members coupled to respective front parts of both sides of the closed loop member, and a back beam coupled to a front part of the back beam support members while extending in a transverse direction of the body.

The back beam support members may be installed to be rectilinearly aligned with the front side members in a forward and rearward direction of the body with the closed loop member interposed therebetween.

The lower portion of the closed loop member may have a cap-type cross-sectional structure that is open toward a rear of the body.

The lower portion of the closed loop member may be provided with a steel reinforcement insert extending in a transverse direction of the body.

The lower reinforcement members may be coupled to the rear of the reinforcement insert to connect a rear part of the reinforcement insert to the subframe.

Each of the lower reinforcement members may be configured by coupling an inner panel inside the body to an outer panel outside the body with a closed space defined therebetween, and have a polyprism shape that extends in a forward and rearward direction of the body.

A plurality of shock absorbing beads may be arranged in the front of the inner panel and outer panel of the lower reinforcement members in a longitudinal direction of the lower reinforcement members.

The rear end of the lower reinforcement members may have a cross-sectional structure that is opened to enlarge an area coupled to the front part of the subframe.

The closed loop member, the front side members, the subframe, and the lower reinforcement members may be connected in turn such that the shape thereof projected in a lateral direction of the body forms a closed curve therein.

As apparent from the above description, the present disclosure can maximize the collision performance of the vehicle by effectively distributing and absorbing the collision loads due to the forward collision of the vehicle, while allowing the body of the vehicle to have a short overhang structure as in the very small electric vehicle or the like.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A front body structure of a vehicle according to exemplary embodiments of the present disclosure will be described below with reference to the accompanying drawings.

Referring to FIGS. 1 to 12, a front body structure of a vehicle according to an embodiment of the present disclosure includes a closed loop member 3 projected on a front surface of a body to form a closed loop and configured such that both sides of the closed loop are coupled to front ends of front side members 1 at both sides of the body, a back beam assembly 5 coupled to the front part of the closed loop member 3, and lower reinforcement members 9 connecting a lower portion 3-L of the closed loop member 3, at both sides thereof, to the front part of a subframe 7.

That is, the present disclosure is to distribute and absorb the collision energy due to the forward collision of the vehicle to a plurality of support components, by coupling the closed loop member 3 to the fronts of the front side members 1 provided at both sides of the body, coupling the back beam assembly 5 to the front of the closed loop member 3, and coupling the lower portion 3-L of the closed loop member 3 to the subframe 7 through the lower reinforcement members 9 so that the back beam assembly 5 primarily absorbs the shocks applied from the front of the vehicle and the lower portion 3-L of the closed loop member supported by the lower reinforcement members 9 secondarily supports and absorbs the shocks together therewith.

In the present embodiment, the closed loop member 3 may be a front end module carrier. A conventional front end module is to constitute a plurality of components, such as a radiator and a lamp, located in the front of the vehicle into a single module, and the front end module carrier is provided to serve as a frame for coupling the front components of the vehicle as described above. Accordingly, the front end module carrier is used as the closed loop member 3 in the present embodiment.

The front end module carrier is configured by interconnecting an upper portion 3-U, both sides 3-S, and a lower portion 3-L and is located in the front of the vehicle, as illustrated in the drawings. The front end module carrier forms a closed loop when it is projected on the front surface of the vehicle perpendicular to the forward and rearward direction of the vehicle.

The back beam assembly 5 includes back beam support members 11 coupled to respective front parts of both sides 3-S of the closed loop member 3, and a back beam 13 coupled to the front parts of the two back beam support members 11 while extending in the transverse direction of the body.

Of course, a bumper may be coupled to the front of the back beam 13, and the back beam support members 11 define a buffer space between the closed loop member 3 and the back beam 13.

Particularly, in the present embodiment, the back beam support members 11 are installed to be rectilinearly aligned with the front side members 1 in the forward and rearward direction of the body with the closed loop member 3 interposed therebetween.

Through such arrangement, the back beam 13 and the back beam support members 11 are firmly supported by the front side members 1 without being greatly affected by the shape or strength and position of the closed loop member 3. Thus, the shocks transmitted through the back beam 13 and the back beam support members 11 may be effectively absorbed through the deformation of the back beam 13 and back beam support members 11.

Figure 8:
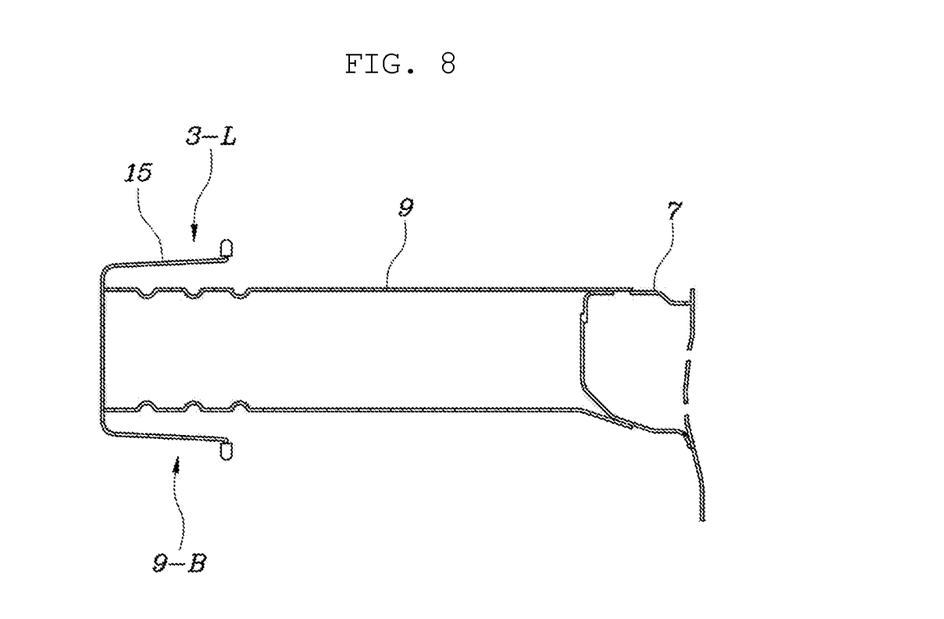
FIG. 8 is a longitudinal cross-sectional view illustrating the lower reinforcement member of FIG. 7.

The lower portion 3-L of the closed loop member 3 may have a cap-type cross-sectional structure that is open toward the rear of the body as illustrated in FIG. 8, to firmly support the shocks acting from the front and to evenly distribute the shocks to the upper and lower sides of the cross section.

In addition, the lower portion 3-L of the closed loop member 3 may be provided with a steel reinforcement insert 15 extending in the transverse direction of the body, to more effectively support the shocks from the front and to transmit the shocks to the rear through both lower reinforcement members 9.

Figure 7:
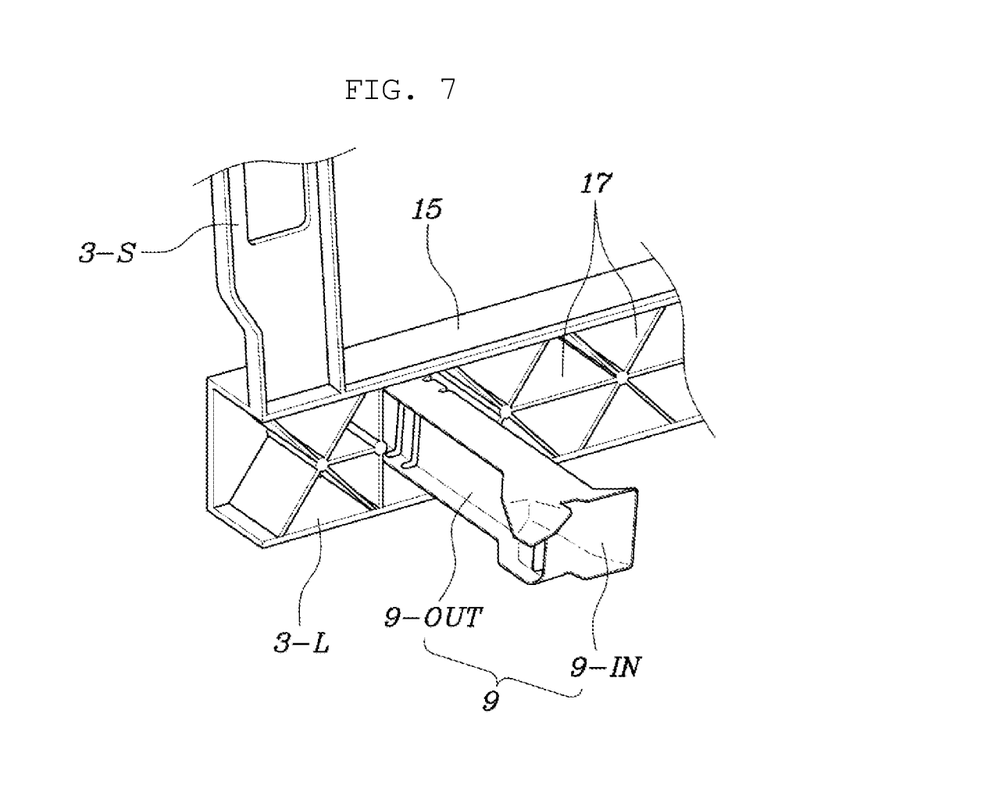
FIG. 7 is a detailed view illustrating that a lower reinforcement member is coupled to the lower portion of a closed loop member.

That is, the lower portion 3-L of the front end module carrier as the closed loop member 3 may consist of a component formed by injection molding the reinforcement insert 15. When the lower portion 3-L consists of the injection-molded component, it will be provided therein with a plurality of reinforcement ribs 17 as illustrated in FIG. 7.

As described above, the lower reinforcement members 9 are coupled to the rear of the reinforcement insert 15 of the lower portion 3-L of the closed loop member 3 by a coupling means such as welding or bolting to connect the rear of the reinforcement insert 15 to the subframe 7.

Each of the lower reinforcement members 9 is configured by coupling an inner panel 9-IN inside the body to an outer panel 9-OUT outside the body with a closed space defined therebetween. The lower reinforcement member 9 may have a polyprism shape that extends in the forward and rearward direction of the body, to support the impact force transmitted from the front and to effectively absorb the impact force by its own deformation.

In particular, a plurality of shock absorbing beads 9-B may be arranged in the front of the inner panel 9-IN and outer panel 9-OUT of the lower reinforcement member 9 in the longitudinal direction of the lower reinforcement member 9, to absorb the impact force applied from the front as possible in the front of the lower reinforcement member 9 and to relatively improve the safety of the rear space.

Figure 9:
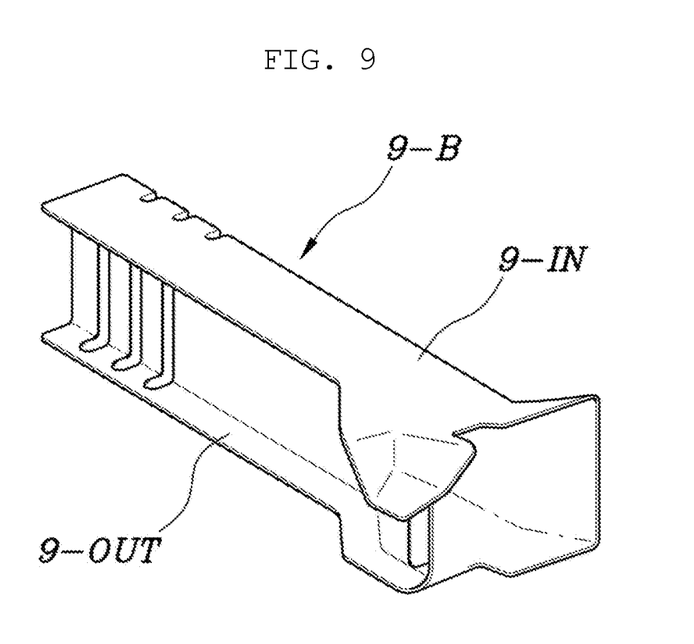
FIG. 9 is a view illustrating the lower reinforcement member.
Figure 10:
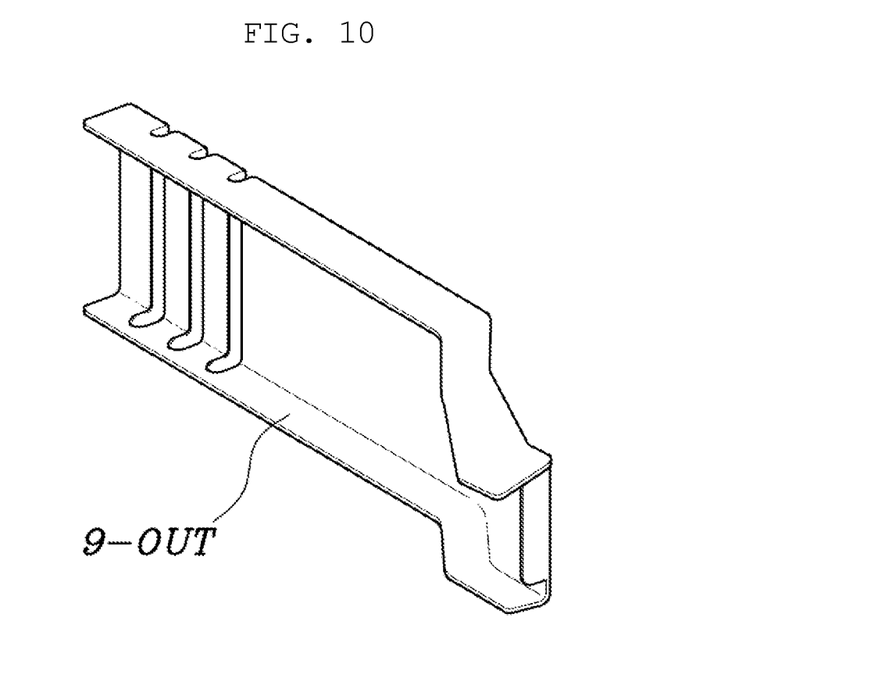
FIG. 10 is a view illustrating the outer panel of FIG. 9.
Figure 11:
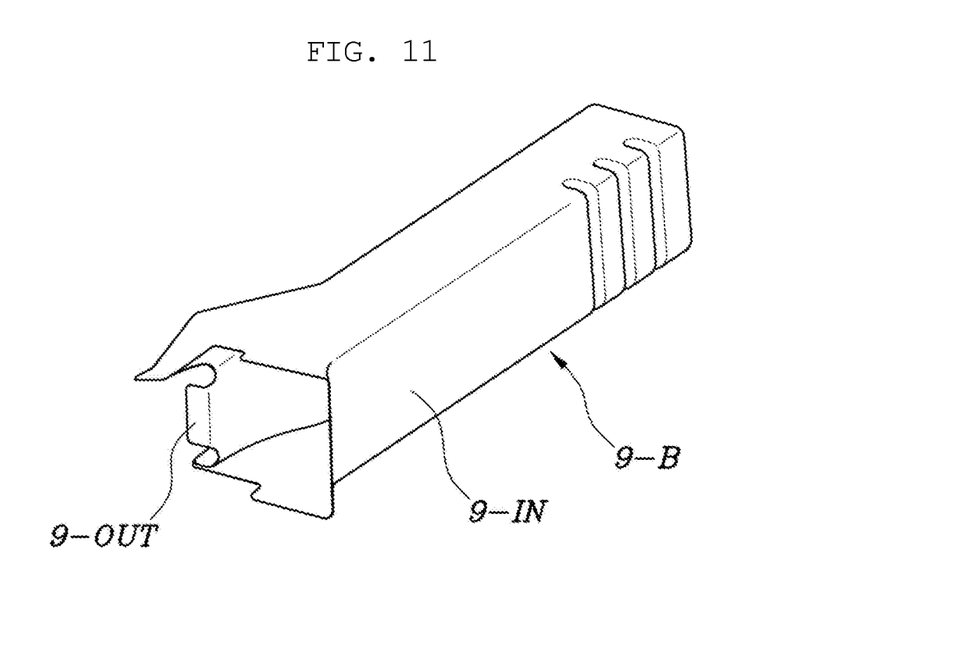
FIG. 11 is a view illustrating the lower reinforcement member of FIG. 9 when viewed from a different angle.
Figure 12:
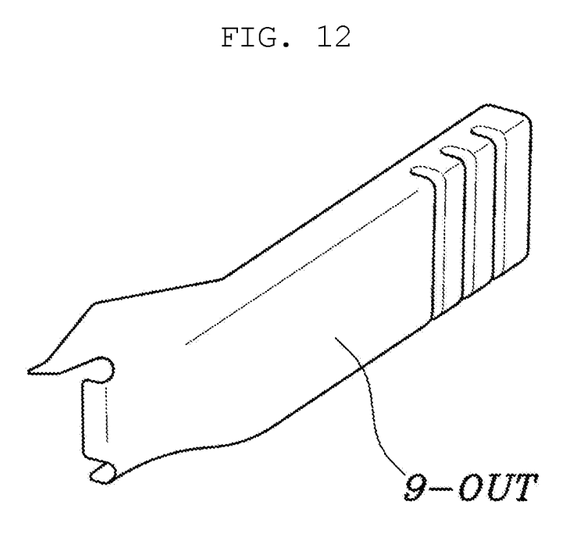
FIG. 12 is a view illustrating the outer panel of FIG. 11.

As illustrated in FIGS. 9 and 11, the rear end part of the lower reinforcement members 9 may have a cross-sectional structure that is opened to enlarge an area coupled to the front part of the subframe 7. Thus, the lower reinforcement members 9 may be firmly coupled to the front part of the subframe 7 and the impact force transmitted from the lower reinforcement members 9 may be distributed and transmitted to the widest possible range of the subframe 7.

Figure 1:
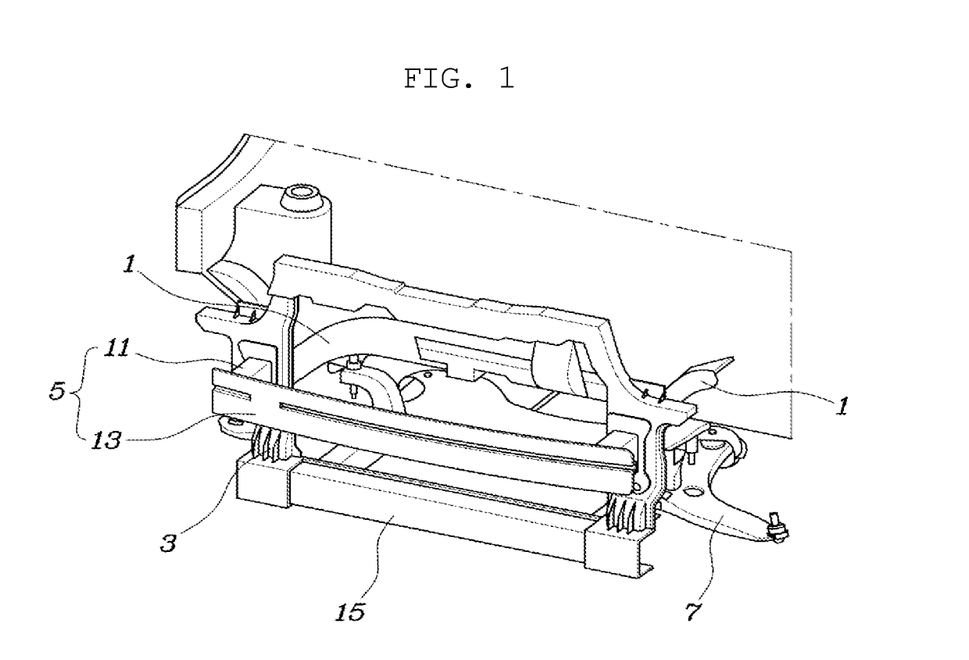
FIG. 1 is a view illustrating a front body structure of a vehicle according to one form of the present disclosure.
Figure 2:
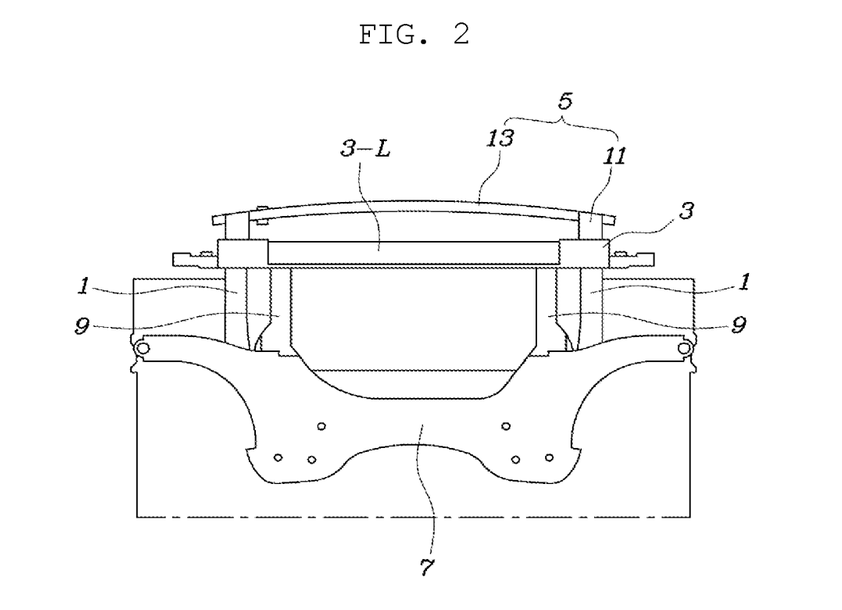
FIG. 2 is a view illustrating the body structure of FIG. 1 when viewed from the bottom.
Figure 3:
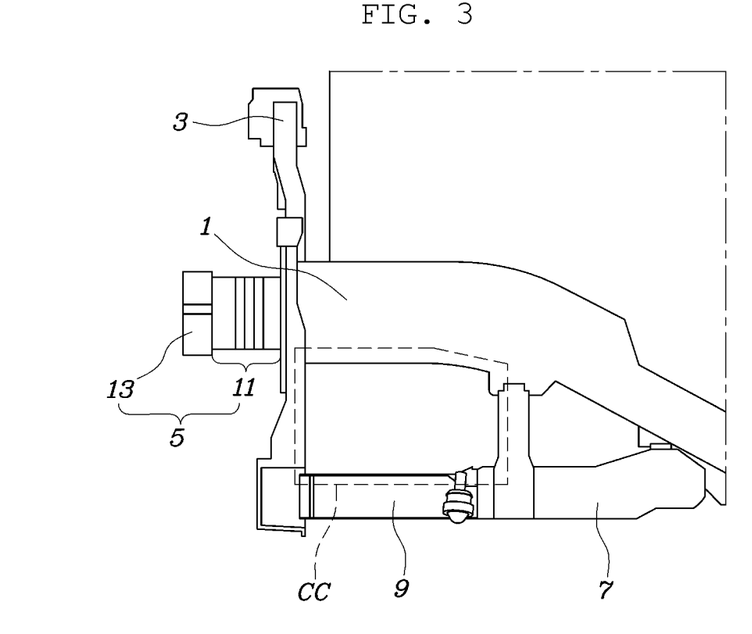
FIG. 3 is a view illustrating the body structure of FIG. 1 when viewed from the side.
Figure 4:
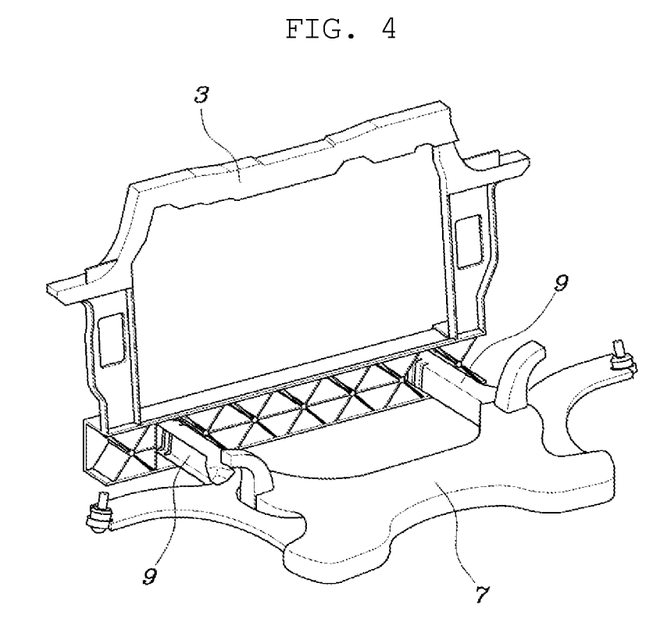
FIG. 4 is a view illustrating some components constituting the body structure of FIG. 1 when viewed from the rear of the body.
Figure 5:
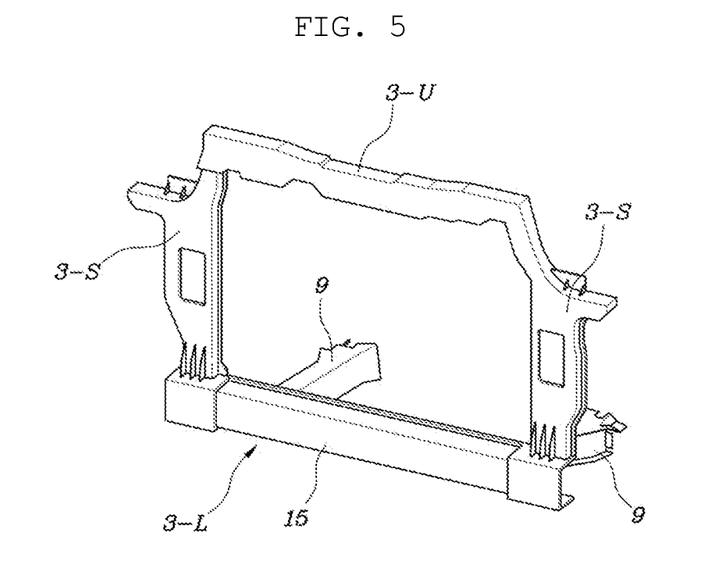
FIG. 5 is a view illustrating some of the components of FIG. 1.
Figure 6:
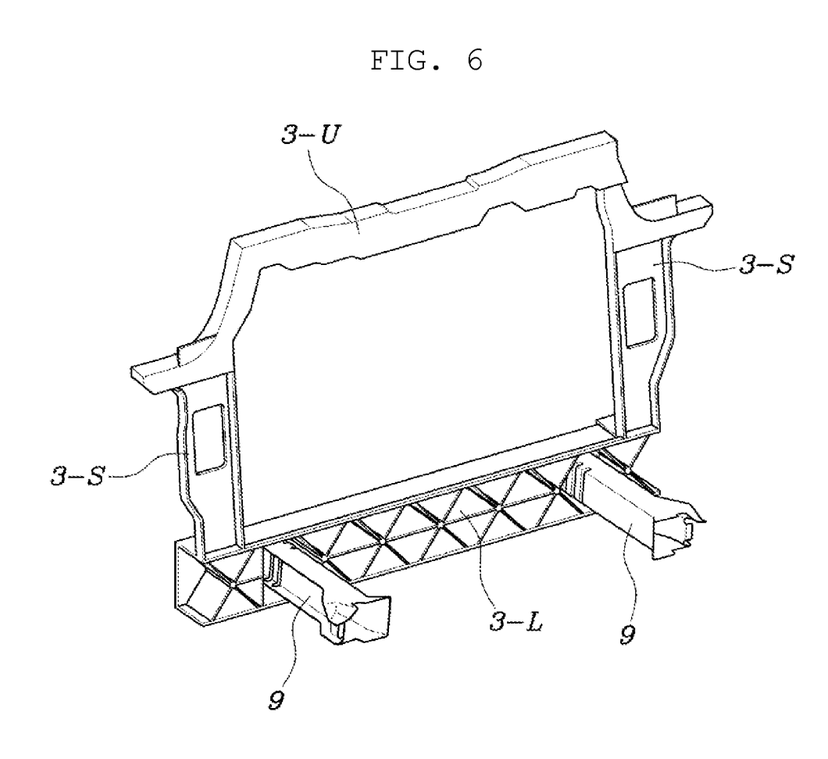
FIG. 6 is a view illustrating the components of FIG. 5 when viewed from the rear of the body.

Meanwhile, referring to FIG. 3, the closed loop member 3, the front side members 1, the subframe 7, and the lower reinforcement members 9 of the present embodiment may be connected in turn such that the shape thereof projected in the lateral direction of the body forms a closed curve CC therein, to support and distribute the impact force acting from the front by a spatial lattice structure and to provide more improved collision performance of the vehicle.

Although the exemplary embodiments of the present disclosure have been disclosed for illustrative purposes, those skilled in the art will appreciate that various modifications, additions and substitutions are possible, without departing from the scope and spirit of the disclosure.

What is claimed is:

1. A front body structure of a vehicle, comprising:
a closed loop member projected on a front surface of a body and configured to form a closed loop such that both sides of the closed loop are coupled to front ends of front side members at both sides of the body;
a back beam assembly coupled to a front part of the closed loop member; and
lower reinforcement members connecting a lower portion of the closed loop member, at both sides thereof, to a front part of a subframe,
wherein the lower portion of the closed loop member is provided with a reinforcement insert extending in a transverse direction of the body, and
wherein the lower reinforcement members are coupled to a rear part of the reinforcement insert to connect the rear part of the reinforcement insert to the subframe.

2. The front body structure according to claim 1, wherein the closed loop member is a front end module carrier.

3. The front body structure according to claim 1, wherein the back beam assembly comprises:
back beam support members coupled to respective front parts of both sides of the closed loop member; and
a back beam coupled to a front part of the back beam support members while extending in a transverse direction of the body.

4. The front body structure according to claim 3, wherein the back beam support members are installed to be rectilinearly aligned with the front side members in a forward and rearward direction of the body with the closed loop member interposed therebetween.

5. The front body structure according to claim 1, wherein the lower portion of the closed loop member has a cap-type cross-sectional structure that is open toward a rear of the body.

6. The front body structure according to claim 1, wherein each of the lower reinforcement members is configured by coupling an inner panel inside the body to an outer panel outside the body with a closed space defined therebetween, and has a polyprism shape that extends in a forward and rearward direction of the body.

7. The front body structure according to claim 6, wherein a plurality of shock absorbing beads are arranged in a front of the inner panel and outer panel of the lower reinforcement members in a longitudinal direction of the lower reinforcement members.

8. The front body structure according to claim 6, wherein a rear end of the lower reinforcement members has a cross-sectional structure that is opened to enlarge an area coupled to the front part of the subframe.

9. The front body structure according to claim 1, wherein the closed loop member, the front side members, the subframe, and the lower reinforcement members are connected in turn such that a shape thereof projected in a lateral direction of the body forms a closed curve therein.

* * * * *